United States Patent [19]

Kine

[11] 4,222,285
[45] Sep. 16, 1980

[54] HAND BRAKE CONTROL DEVICE HAVING ADJUSTABLE MAIN AND AUXILIARY LEVERS

[75] Inventor: Masayoshi Kine, Osaka, Japan

[73] Assignee: Shimano Industrial Company, Limited, Osaka, Japan

[21] Appl. No.: 955,366

[22] Filed: Oct. 27, 1978

[30] Foreign Application Priority Data

Nov. 4, 1977 [JP] Japan ............................ 52-148538

[51] Int. Cl.$^2$ ...................... G05G 11/00; B62K 23/06; B62K 3/02
[52] U.S. Cl. ................................. 74/480 R; 74/489; 74/525; 74/526; 74/527
[58] Field of Search ................. 74/526, 527, 480 R, 74/488, 489, 525

[56] References Cited

U.S. PATENT DOCUMENTS

| | | | |
|---|---|---|---|
| 3,596,530 | 8/1971 | Yoshigai | 74/489 X |
| 3,719,104 | 3/1973 | Dian | 74/489 |
| 3,752,005 | 8/1973 | Yoshikawa | 74/480 R |
| 4,084,449 | 4/1978 | Kine | 74/480 R |

Primary Examiner—Allan D. Herrmann
Attorney, Agent, or Firm—Stevens, Davis, Miller and Mosher

[57] ABSTRACT

A brake control device for a bicycle is disclosed having main and auxiliary levers which are pivoted to a bracket fixed to the handle bar of a bicycle. The levers are mounted to be swingable independently of one another to swingingly move a wire hook which is integral with the auxiliary lever and which anchors one end of a brake control wire. The main lever is provided with an engaging member for swinging the wire hook upon main lever operation and between the engaging member and wire is provided an adjusting bolt for adjusting the relative position of the wire hook and engaging member. Adjustment of the adjusting bolt controls the distance between the grip portion of the auxiliary lever and the portion of the handle bar opposite thereto. An adjustment of the distance between the main lever and the portion of the handle bar opposite it can also be effected through the provision of an adjustable ratchet mechanism provided in association with the main lever.

12 Claims, 6 Drawing Figures

HAND BRAKE CONTROL DEVICE HAVING ADJUSTABLE MAIN AND AUXILIARY LEVERS

BACKGROUND OF THE INVENTION

The present invention relates to a brake control device for a bicycle, and more particularly, to a brake control device mounted to what is commonly referred to as the drop-type handle bar which has a straight rod section and at opposite ends of the rod section a pair of U-like shaped bent rod sections. The brake control device commonly used with a drop-type handle bar generally has a main lever for actuating the brake while the rider is gripping the bent rod sections and an auxiliary lever which is positioned so that a rider may grasp the brake control device while gripping the straight rod section of a handle bar.

The brake control device is mounted to a bent section of the handle bar by a bracket which is positioned to provide access to the main and auxiliary levers of the brake control device.

The brake control device described as above is fixed to the handle bar by the bracket and thereafter the distances between the main and auxiliary levers and opposite handle bar portions is fixed; that is, the rider cannot adjust the distances between the handle bars and the main and auxiliary levers.

Even when the mounting bracket of the brake control device is set to be fixed at a desired position on the handle bar so as to provide suitable distances between the main and auxiliary levers and the corresponding handle bar sections to provide an easy gripping of the levers, different drop-type handle bars and different mounting positions of the brake control device bracket causes great changes in the lever to handle bar distances, especially the distance between the auxiliary lever and the straight portion of the handle bar. Thus, it has been difficult with conventional brake control devices to keep suitable distances between the main and auxiliary levers under various conditions.

Moreover, even if a proper distance is selected for a standard drop-type handle bar, the conventional brake control device cannot be adjusted so that the distance between main and auxiliary levers and handle bars fits the size of a rider's hand or his particular preference. Accordingly, it has been impossible with conventional brake control devices to conform the brake gripping distance, i.e., the distance between handle bar and brake lever, to every rider.

The present invention has been designed to overcome the foregoing problems. A main object of the invention is to provide a brake control device for a bicycle which is capable of having the distance between the main and auxiliary levers and corresponding sections of the handle bar adjusted, particularly that distance between the auxiliary lever and a corresponding section of the handle bar opposite thereto which heretofore has been very difficult to adjust satisfactorily.

Another object of the invention is to provide a brake control device for a bicycle in which the distance between the main lever and a corresponding section of the handle bar can be adjusted.

The foregoing objects have been achieved by providing a brake control device in which the main and auxiliary levers are pivoted to the bracket which fixes the brake control device to a handle bar, with the main and auxiliary levers being swingable independently of one another. A wire hook which is integral with the auxiliary lever swings in association therewith and is also mounted to the bracket, the wire hook retaining one end of a control wire whose other end is connected with the bicycle brake. The main lever is provided with an engaging member which, when the main lever is controlled, engages with the wire hook causing it to swing. An adjust bolt is provided between the wire hook and engaging member for adjusting the relative position of the main lever to the wire hook which causes an adjustment in the grip dimension between the auxiliary lever and the straight section of the handle bar opposite thereto.

The main lever is provided with an adjusting member which is controllably movable towards a front wall of the bracket which causes an adjustment in the grip dimension between the main lever and bent rod section of the handle bar opposite thereto.

Both the adjust bolt and adjusting member can be controlled in combination so that the extension of the brake control wire and contraction of an outer sheath thereof may be adjusted without changing dimensions between the grips of the main and auxiliary levers and the handle bars. In addition, the adjust bolt can be utilized to loosen the control wire to expand the distance between brake shoes controlled by the brake control device. Thus, even when used with a caliper brake, the adjust bolt can facilitate removal of the bicycle wheel from between the brake shoes.

These and other objects and novel features of the invention will be more apparent from the following description of the invention taken in conjunction with the accompanying drawings which show one embodiment thereof.

DETAILED DESCRIPTION OF THE INVENTION

Figure 1:
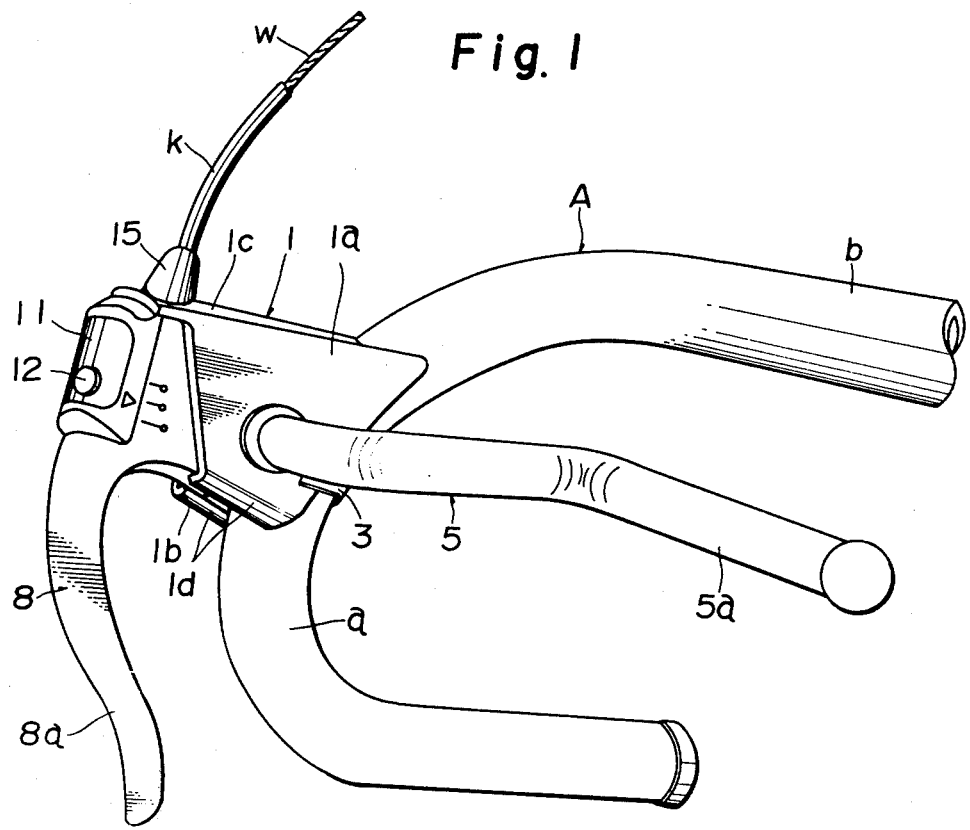
FIG. 1 is a perspective view of an embodiment of the brake control device of the invention attached to a drop-type handle bar.

Referring to the drawings, numeral 1 designates a bracket having a clip band 2 attached thereto for attaching the brake control device of the invention to a handle bar. The bracket 1 comprises a pair of side walls 1a and 1b which have respective shaft bores, a front wall 1c and a rear wall 1d. A support 3 is fixed between the side walls 1a and 1b through which a screw 4 is screwed and tightened at its tip to a washer 21 attached to both ends of the clip band 2. Screw 4 cooperating with washer 21 and support 3 serves to positively clamp bracket 1 to the handle bar A.

Handle bar A comprises a straight rod section b and a pair of U-like shaped bent rod sections a at both ends thereof. Each of the bent rod sections a carries a respective bracket 1 although only one of the bent rod sections a carrying a single bracket 1 is shown in FIG. 1.

An auxiliary lever 5 is pivotally supported between both side walls 1a and 1b of the bracket 1 through bushings 6 and 6a. The auxiliary lever is formed as a pipe and has a grip 5a and a head 5b which forms a spindle. The grip 5a and head 5b are connected with a trunk at right angles, the head 5b being directed in parallel reversely to the grip 5a, the grip in turn being arranged in parallel to the straight rod section b of the handle bar A.

Figure 2:
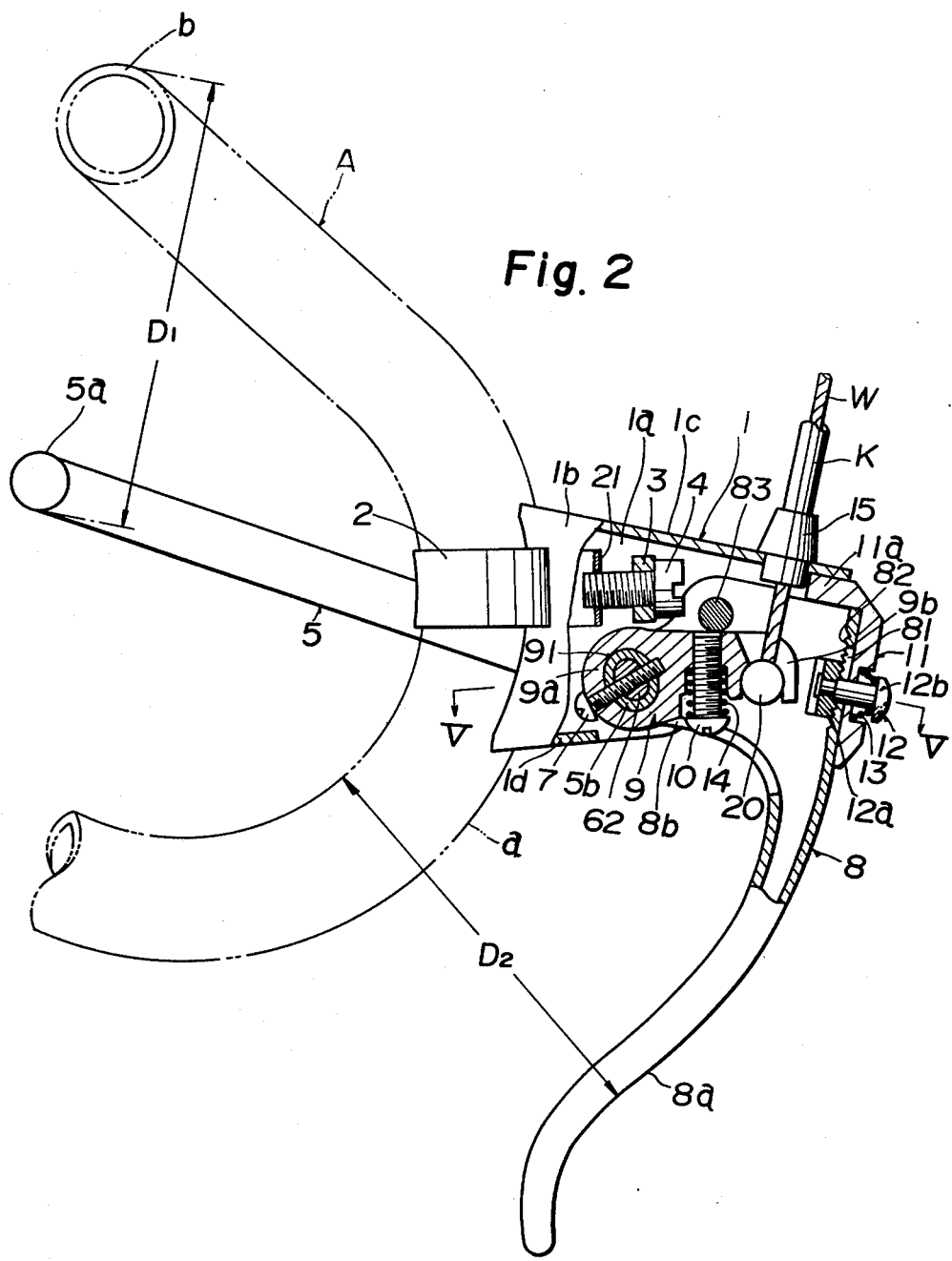
FIG. 2 is a partially cutaway side view of the embodiment of the brake control device of the invention.
Figure 6:
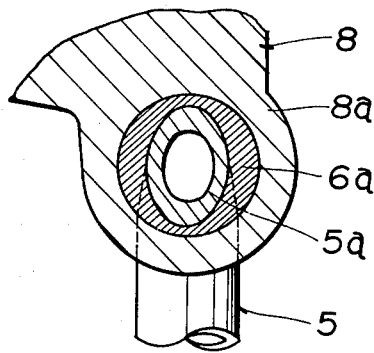
FIG. 6 is a sectional view taken on the line VI—VI in FIG. 5.

The head 5b of the auxiliary lever 5 is axially larger than an interval between the side walls 1a and 1b of bracket 1 and projects through bores provided in the side walls. Head 5b is also elliptic in section as shown in FIGS. 2 and 6. Bushings 6 and 6a are provided in the respective bores of the side walls 1a and 1b and have an internal elliptic shape to fit the head 5b of the auxiliary lever 5 and a round external periphery to fit the bores. With this construction, the head 5b is inserted into the bushing 6 and 6a such that it is non-rotatable while the auxiliary lever 5 is swingably supported to the bracket 1 through the bushings 6 and 6a. The elliptic cross section of head 5b also serves to non-rotatably support a wire hook as further described below.

Bushing 6 has a flange 61 and a stem 62 as a continuation of the flange. Flange 61 abuts against the outer side of the wall 1b and the stem 62 is inserted into the head 5b and is radially perforated at an intermediate portion thereof with the set screw 7 which locks the auxiliary lever 5 against slipping out of bracket 1.

Figure 5:
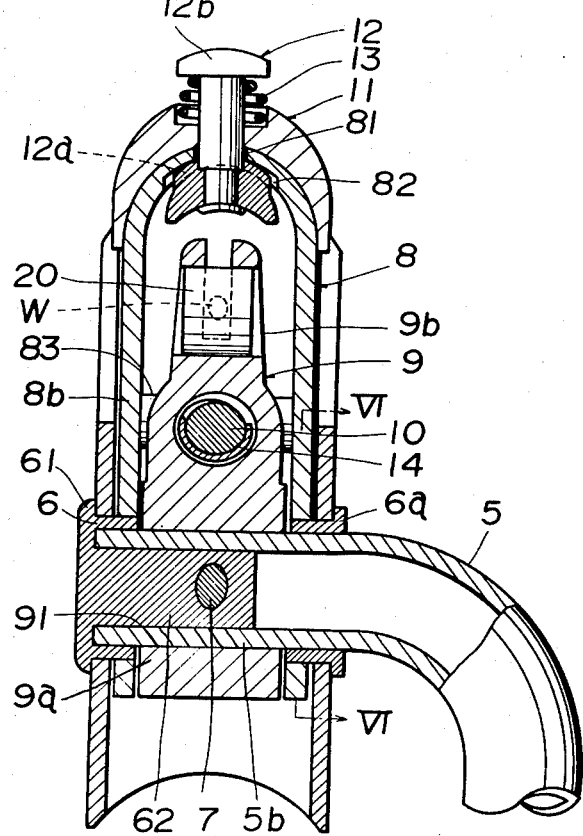
FIG. 5 is an enlarged sectional view taken on the line V—V in FIG. 2.

A main lever 8 is provided with a grip 8a and a mounting portion 8b as shown in FIG. 5. The grip 8a is opposite to the bent portion section a of handle bar A and the mounting portion 8b is U-like shaped in section. The mounting portion 8b also has, at both opposite side walls thereof, bores through which the main lever 8 can be inserted onto the bushings 6 and 6a thereby being pivoted within the bracket 1. The mounting portion 8b also has at the inner surface of a top wall thereof a first engagement 82 of ratchet teeth the purpose of which will be described in more detail below. At a substantially intermediate portion of the opposite walls of the mounting portion 8b an engaging member 83 is provided in engagement with a wire hook 9.

Wire hook 9 serves to hook an end piece of one end of a brake control wire which is connected at its other end to the brake and has a base 9a and an end hook 9b. The base 9a is provided with an elliptic bore 91 which fits onto the elliptic head 5b of the auxiliary lever 5, the base 9a being supported to the head 5b at an axially intermediate portion thereof. Thus, rotative movement of head 5b of the auxiliary lever causes swinging movement of wire hook 9 in association therewith. Set screw 7 prevents wire hook 9 from moving axially with respect to the auxiliary lever while wire hook 9 holds at the end hook 9b the end 20 of the brake control wire W. The control wire W is encased with a sheath K and an outer sheath stop 15 is provided which abuts against the front wall 1c of bracket 1.

The wire hook 9 is engaged at its intermediate side edge with the engaging member 83 provided on the main lever 8, thereby being movable in association with movement of the main lever. Thus, when a rider grasps the grip 8a of a main lever 8 to initiate braking action, wire hook 9 is rotated through the engaging member 83 abutting thereagainst so as to pull the control wire W connected with the brake. On the other hand, when a rider releases the main lever 8, the return spring of the brake pulls the wire W causing the wire hook 9 to rotate back and return the main lever 8 to its rest position.

An adjust bolt 10 which is screwably movable toward the engaging member 83 is screwed to the wire hook 9 at a substantially intermediate portion thereof. The bolt 10 abuts at its tip against engaging member 83. Thus, screwing movement of the bolt 10 causes an adjustment in the relative position of the main lever 8 to the wire hook 9, whereby auxiliary lever 5 is moved to adjust the distance or grip-dimension D1 between the grip 5a of the auxiliary lever and the section of the handle bar A opposite thereto. A locking spring 14 is provided for the adjust bolt 10.

An adjusting member 11 having an abutment 11a contacting the front end of the front wall 1c of bracket 1 is attached to the main lever 8 so as to be movable with respect thereto. The adjusting member 11 is U-like shaped in section as shown in FIG. 5 and is fit to the outside of a guide slide 81 provided in a top portion of main lever 8 while being mounted to the main lever 8 through a control member 12 the latter being supported movably to the adjusting member 11.

Figure 3:
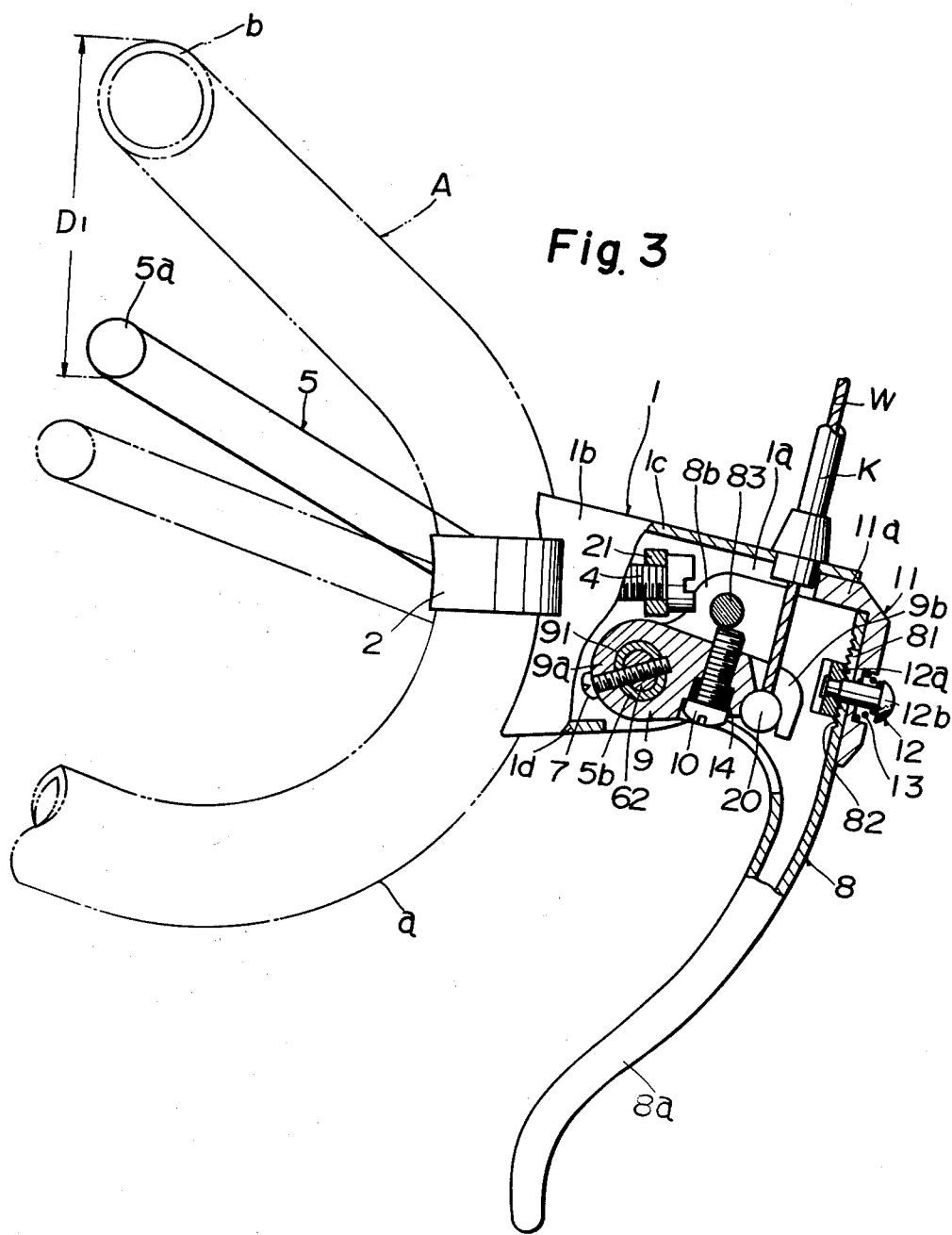
FIGS. 3 and 4 illustrate an adjustment of the distances between the grips of the main and auxiliary levers and the handle bar portions corresponding thereto.

The control means 12 has a second engagement element 12a in mesh with ratchet teeth provided on a first engagement element 82. Control means 12 also has a control body projecting outwardly of the second engagement element 12a through the slot 81 and the adjusting member 11, as well as a spring 13 inserted between the control body 12b and the adjusting member 11. Spring 13 always urges the second engagement element 12a into mesh with the first engagement element 82. The control body 12 is pushed against the spring 13 to cause disengagement of the second engagement element 12a from the first engagement element 82 to thereby allow adjusting member 11 to slide with respect to the main lever 8 to adjust the distance or grip-dimension D2 between the grip 8a and a corresponding section of the handle bar A. The adjustment of the grip-dimensions betwen the main and auxiliary levers of the brake control device and the handle bar A will now be described. When a distance D1 between a grip 5a of the auxiliary lever 5 and the straight rod section b of the handle bar A is too long to fit a riders hand, the adjust bolt 10 is screwed forward to move the wire hook 9 apart from the engaging member 83 as shown in FIGS. 2 and 3 to thereby adjust the relative position of the main lever 8 to the wire hook 9. This adjustment causes the auxiliary lever 5 to turn clockwise thereby shortening the distance D1.

On the other hand, when the distance D1 is too short, the adjust bolt 10 is reversely rotated to adjust the relative position of the auxiliary lever relative to the handle bar A. In this instance, the auxiliary lever 5 is rotated counterclockwise as shown in FIGS. 3 and then 2.

When a distance D2 existing between a grip 8a of the main lever 8 and the bent rod section A is too long to fit a rider's hand, the control means 12 is pushed against spring 13 to disengage the second engagement element 12a from the ratchet teeth of the first engagement element 82. This allows the adjusting member 11 to slide apart from the main lever 8 toward the front wall 1c of the bracket 1 as shown in FIG. 4 whereby the main lever 8 is turned clockwise from the position shown in FIG. 2 to thereby shorten the distance D2 as desired.

Figure 4:
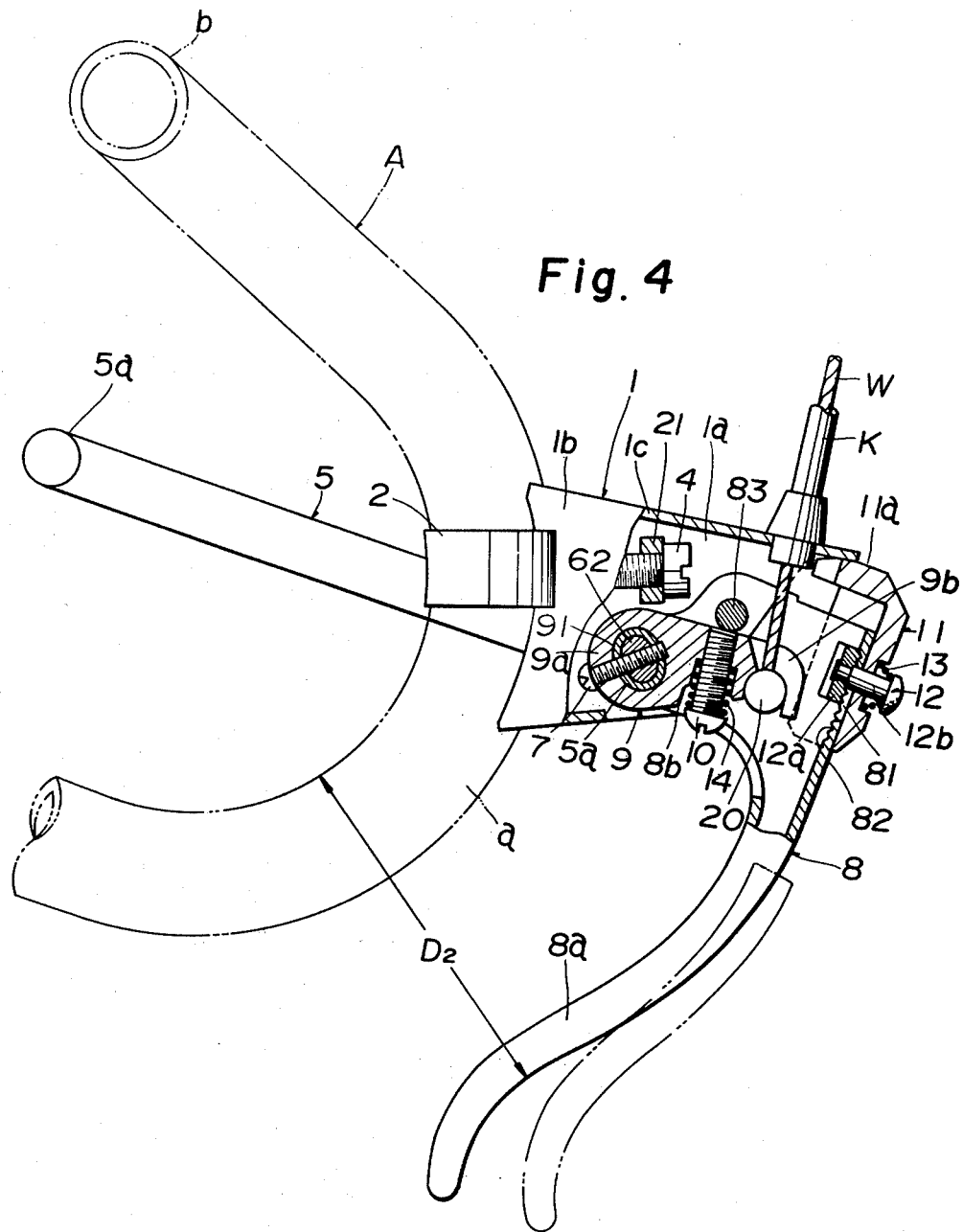

When the distance D2 is too small, the control means 12 is pushed against the spring 13 to again disengage the second engagement element 12a from the ratchet teeth of the first engagement element 82 while the adjusting member is slid to approach the main lever 8 causing the main lever 8 to be turned counterclockwise as shown in FIG. 4. As a result, the distance D2 is increased to fit a rider's hand as illustrated in FIG. 2.

The brake control device of the present invention also allows for an adjustment in the relative position of the main lever 8 to the wire hook 9 through the adjust bolt 10 thereby adjusting the extension of the control wire W and contraction of its outer sheath K.

In addition, when the wire hook 9 has been rotated clockwise to a predetermined large extent, the adjust bolt 10 may then be screwed backward to turn the wire hook 9 counterclockwise to loosen the control wire W thereby facilitating a quick removal of the wire from its associated wire hook 9. Also, when the device is used with a caliper brake, the brake shoes can easily be widened to increase the interval therebetween by loosening the wire in this manner thereby facilitating removal of the bicycle wheel from between the brake shoes.

As the foregoing description clearly demonstrates, the brake control device of the invention is very simple in construction yet it achieves a relatively easy adjustment in the grip distances between the main and auxiliary control levers and the handle bar. The construction includes a wire hook retaining one end of a brake control wire integrally mounted to the auxiliary lever and moving in association therewith and an adjust bolt provided for adjusting the relative position of the main lever to the wire hook. Movement of the adjust bolt achieves an easy adjustment of the distance between the auxiliary lever and corresponding section of the handle bar opposite to its grip. As a result, the control device, even when attached to various drop-type handle bars other than of standard size or shape, is capable of being adjusted so that every rider may easily grip the auxiliary lever positioned at a suitable distance from the handle bar. Because of the simplicity of its construction, the control device is also inexpensive to produce.

The adjust bolt also serves to adjust the relative position of the main lever to the wire hook to cause an extension of the control wire and contraction of its outer sheath to be adjustable without changing the distance between the lever and handle bar. Also, the brake shoes can be renewed very quickly and readily removed from the bicycle because of the decreased tension in the control wire.

The invention also employs an adjusting member mounted movable with respect to the main lever which provides the brake control device with an adjustment of the distance between the grip of the main lever and a corresponding opposing section of the handle bar.

While the preferred embodiment of the invention has been shown and described above, the invention is not limited to this specific construction described and illustrated. This construction is to be considered as merely exemplary of the invention which is limited solely by the attached claims. cm What is claimed is:

1. A brake control device for a bicycle comprising, a bracket pivotally supporting a main and auxiliary lever for swinging movement independent of one another, a wire hook supported within said bracket to move in association with swinging movement of said auxiliary lever, one end of said wire hook being adapted to engage with a brake control wire, an engaging member provided on said main lever for engaging said wire hook and causing its movement upon swinging movement of said main lever, and an adjustment means for adjusting the relative position of said engaging member with respect to said wire hook.

2. The brake control device for a bicycle according to claim 1 further comprising means for adjusting said main lever relative to said bracket.

3. A brake control device for a bicycle, comprising a bracket fixed to a bicycle handle bar, a main lever and an auxiliary lever each having gripping portions and being pivotally supported to said bracket to swing independently of one another, a control wire having one end connected to a bicycle brake and another end connected with a wire hook positioned within said bracket, an outer sheath guiding said control wire, said bracket including an outer-stop for supporting said outer sheath, said wire hook being connected with said auxiliary lever to swing in association with movement of said auxiliary lever, said main lever having an engaging member in engagement with said wire hook to cause said wire hook to swing when said main lever is operated, and an adjust bolt provided between said engaging member and wire hook for adjusting the relative position of said main lever with respect to said wire hook, said adjust bolt being controllable to adjust the distance between the gripping portion of said auxiliary lever and the section of said handle bar corresponding to said auxiliary lever gripping portion.

4. The brake control device for the bicycle according to claim 1, wherein said auxiliary lever has a crank-like shape forming a gripping portion and a shaft portion shifted with respect to said gripping portion and extending in parallel in an opposite direction of said gripping portion, and said bracket has a bore into which said shaft portion is received, said shaft portion being inserted into said bore to pivotally support said auxiliary lever to said bracket, said wire hook being non-rotatably supported to said shaft portion.

5. The brake control device for a bicycle according to claim 4, wherein said main lever is pivoted to said shaft portion of said auxiliary lever.

6. The brake control device for a bicycle according to claim 4, wherein said shaft portion of said auxiliary lever has a non-circular cross sectional shape and is pivoted to said bracket through bushings having round outer peripheries, and said wire hook is provided with an engaging bore having a non-circular cross sectional shape corresponding to that of said shaft portion of said auxiliary lever, said bore engaging with the non-circular outer periphery of said shaft portion so that said wire hook is inserted onto said shaft portion and is non-rotatable with respect thereto.

7. The brake control device for the bicycle according to claim 6, wherein said main lever is pivoted to said bushings.

8. The brake control device for a bicycle according to claim 6 wherein said non-circular cross sectional shape is elliptic.

9. A brake control device for a bicycle, comprising a bracket fixed to a bicycle handle bar and having a pair of side walls and one front wall, a main and an auxiliary lever each having gripping portions and being pivotally supported between said side walls of said bracket to swing independently of one another, a control wire having one end connected to a bicycle brake and another end connected with a wire hook positioned within said bracket, an outer sheath guiding said control wire, said bracket including an outer-stop for supporting said outer sheath, said wire hook being connected with said auxiliary lever to swing in association with movement of said auxiliary lever, said main lever having an engaging member in engagement with said wire hook to cause said wire hook to swing when said main lever is operated, an adjusting member connected with said main lever and being adjustably movable toward the front wall of said bracket, and an adjust bolt provided between said engaging member and wire hook for adjusting the relative position of said main lever with respect to said wire hook, said adjust bolt being controllable to adjust the distance between the gripping portion of said auxiliary lever and the section of said handle bar corresponding to said auxiliary lever gripping portion and said adjusting member being controllable to adjust the distance between the gripping portion of said main lever and the section of said handle bar opposite to said main lever gripping portion.

10. The brake control device for a bicycle according to claim 9, wherein said main lever includes a U-shaped portion having at a top portion thereof an elongated guide slot through which said adjusting member is movably supported and at the inner surface of said top portion a first engagement element, said adjusting member having a control member which includes a second engagement element in mesh with said first engagement element, said control member being urged by a spring to force the meshing engagement of said first and second engagement elements to prevent said adjusting member from moving with respect to said main lever.

11. The brake control device for a bicycle according to claim 10, wherein said control member includes an operating member projecting out of said adjusting member through said elongated guide slot, said spring being positioned between said operating member and adjusting member for urging said second engagement element toward said first engagement element, said operating member being operable against the force of said spring to disengage said second engagement element from said first engagement element.

12. The brake control device for a bicycle according to claim 10, wherein said first engagement element is formed of ratchet teeth and said second engagement element is formed of a pawl in mesh with said ratchet teeth.

* * * * *